(12) United States Patent
Nagashima

(10) Patent No.: US 6,884,006 B2
(45) Date of Patent: Apr. 26, 2005

(54) INSERT-EXCHANGEABLE, ROTARY TOOL AND THROWAWAY INSERT

(75) Inventor: Yoshimitsu Nagashima, Chiba-ken (JP)

(73) Assignee: Hitachi Tool Engineering, Ltd., Tokyo (JP)

(*) Notice: Subject to any disclaimer, the term of this patent is extended or adjusted under 35 U.S.C. 154(b) by 265 days.

(21) Appl. No.: 10/151,936

(22) Filed: May 22, 2002

(65) Prior Publication Data

US 2003/0002929 A1 Jan. 2, 2003

(30) Foreign Application Priority Data

May 25, 2001 (JP) .................................... 2001-157805
Jan. 15, 2002 (JP) .................................... 2002-005788

(51) Int. Cl.[7] .................................................. B26D 1/00
(52) U.S. Cl. ............................................. 407/34; 407/113
(58) Field of Search ........................... 407/34, 35, 42, 407/113, 114, 115

(56) References Cited

U.S. PATENT DOCUMENTS

| | | | |
|---|---|---|---|
| 4,294,565 A | 10/1981 | Erkfritz | |
| 4,384,288 A | 5/1983 | Walton | 340/825.34 |
| 4,514,731 A | 4/1985 | Falck et al. | 340/825.03 |
| 4,868,908 A | 9/1989 | Pless et al. | 323/267 |
| 5,103,156 A | 4/1992 | Jones et al. | 320/35 |
| 5,244,318 A * | 9/1993 | Arai et al. | 407/42 |
| 5,406,297 A | 4/1995 | Caswell et al. | 343/741 |
| 5,485,520 A | 1/1996 | Chaum et al. | 380/24 |
| 5,640,251 A | 6/1997 | Tone et al. | 340/825.34 |
| 5,718,540 A * | 2/1998 | Satran et al. | 407/42 |

FOREIGN PATENT DOCUMENTS

| | | | |
|---|---|---|---|
| EP | 916439 A1 * | 5/1999 | 407/113 |
| EP | 1075889 A1 | 2/2001 | |
| FR | 1536303 A | 8/1968 | |
| GB | 1142820 A | 2/1969 | |
| JP | 2000-5921 A | 1/2000 | |
| JP | 2000-126920 A | 5/2000 | |

OTHER PUBLICATIONS

European Search Report for EP 02 25 3716 dated Aug. 8, 2002.

* cited by examiner

Primary Examiner—Willmon Fridie, Jr.
(74) Attorney, Agent, or Firm—Sughrue Mion, PLLC (57) ABSTRACT

An insert-exchangeable, rotary tool to which throwaway inserts are detachably attached, the insert comprising substantially square-shaped face and bottom surface and an outward curved flank on each side surface, and having a positive-type shape in which an outward curved edge line formed by the face and the flank serves as a cutting edge; each flank having in a substantially center portion a flat surface portion extending to the bottom surface without contacting with the cutting edge; a major cutting edge formed by the outward curved edge line circularly extending from its lowermost point toward a periphery of the tool when the insert is attached to the insert-exchangeable, rotary tool, such that it has a negative radial rake; and the lowermost point being positioned inward a center of the outward curved major cutting edge.

12 Claims, 11 Drawing Sheets

INSERT-EXCHANGEABLE, ROTARY TOOL AND THROWAWAY INSERT

FIELD OF THE INVENTION

The present invention relates to an insert-exchangeable, rotary tool such as a face-milling tool, etc. suitable for high-feed working, and throwaway insert used therein.

BACKGROUND OF THE INVENTION

As an insert-exchangeable, rotary tool suitable for high feed, Japanese Patent Laid-Open No. 2000-126920 discloses a face-milling cutter equipped with circular throwaway inserts. This face-milling cutter comprises round throwaway inserts each having a mounting hole at a center, cylindrical holders each having at a tip end a supporting seat for fixing the round throwaway insert by a flat head screw in such a direction that its upper surface serves as a flank and its side surface serves as a face, a cutter body for fixing the cylindrical holders, and wedges each inserted into a plurality of circular holes provided in a peripheral portion of a front surface of the cutter body in parallel with its axis and pressed into a gap between a flat surface provided on a periphery of each cylindrical holder and the cutter body. When fixed to the holder, the throwaway insert is inclined toward the rotational rearward direction and the periphery of the cutter, with a cutting edge formed by a crossing edge of the upper surface and the side surface being outward curved in both front surface direction and rotation direction of the cutter. Thus, with each round throwaway insert attached to the tool inclined in two directions, a large-radius, circular cutting edge is provided, providing reduced impact at high-feed cutting.

Because this face-milling tool comprises round throwaway inserts, the surfaces of each insert with which the insert is fixed to the tool are a bottom surface and a side surface. However, because the side surface of the insert is a curved surface, precise positioning is difficult, needing an edge position-controlling screw. Further, because the round insert is attached inclined in two directions, the insert is likely to rotate during cutting, resulting in the likelihood that the edge position deviates. Accordingly, this tool is suitable for working at a cutting depth of as small as 0.1–1 mm or less, and if the tool is designed bigger for deeper cutting, an edge engaged to cutting becomes too long, resulting in too large cutting resistance.

Figure 24:
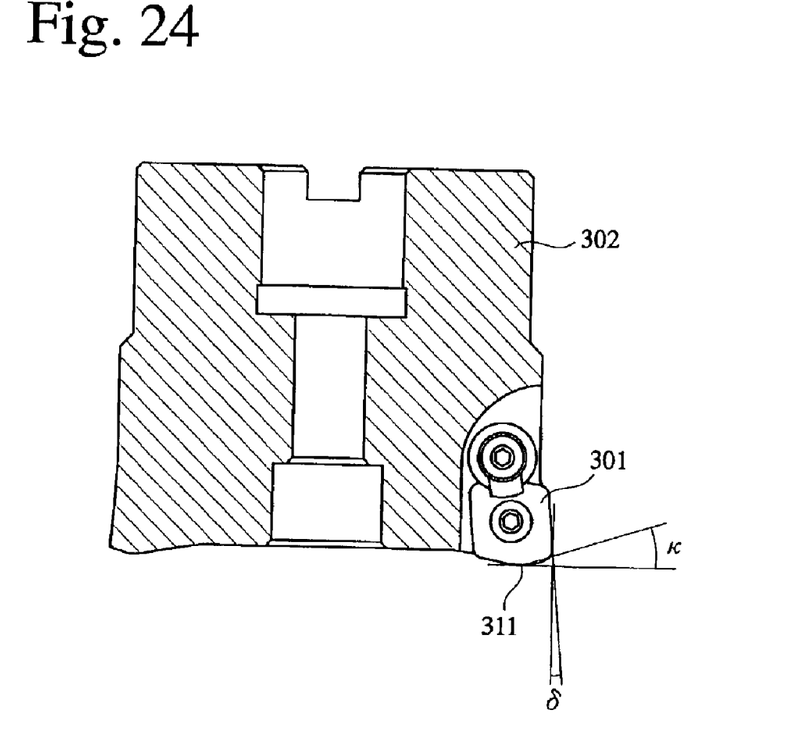
FIG. 24 is a partial cross-sectional view showing the high-feed, throwaway-type, rotary tool described in Japanese Patent Laid-Open No. 2000-5921.

As another example of high-efficiency, insert-exchangeable, rotary tools, Japanese Patent Laid-Open No. 2000-5921 discloses, as shown in FIG. 24, a high-feed throwaway-type rotary tool comprising a plurality of throwaway inserts 301, each throwaway insert 301 having a straight or circular peripheral cutting edge so as to have a back taper δ to a circular major cutting edge 311 and a center axis of tool 302, and the major cutting edge 311 having a cutting edge angle κ of 3–35°. With the circular major cutting edge 311 of the throwaway insert 301, chips generated at the initial stage of cutting are thin and become gradually thicker as the tool rotates. Accordingly, a large impact force is not applied to the tool, enabling high feed in the cutting of steel suffering from little variation of cutting conditions. For instance, in the case of cutting steel, which is free from intermittent cutting, stable cutting is achieved even under the conditions of a feed fz per one tooth of 2 mm/tooth.

It has been found, however, that this high-feed, throwaway-type, rotary tool is not necessarily satisfactory to achieve a higher feed per one tooth. In addition, because this throwaway insert 301 has circular major cutting edges 311 on two opposing surfaces with two other flat opposing surfaces for abutting the tool, it is not economically advantageous.

Accordingly desirable are a long-life, insert-exchangeable, rotary tool such as a face-milling tool capable of performing stable cutting without cracking throwaway inserts even for high-feed working at a cutting depth of about 1–6 mm, particularly for works suffering from large variations of cutting conditions such as works having many holes and pre-hardened steel, etc., and throwaway inserts used therefor.

OBJECTS OF THE INVENTION

Accordingly, an object of the present invention is to provide an insert-exchangeable, rotary tool such as a face-milling tool, which can be operated at a high feed while keeping high precision, and can stably cut works suffering from large variations of cutting conditions such as works with many holes, pre-hardened steel, etc.

Another object of the present invention is to provide a throwaway insert used for such an insert-exchangeable, rotary tool, which has a long life and excellent crack resistance.

DISCLOSURE OF THE INVENTION

As a result of intense research in view of the above objects, the inventors have found that by attaching substantially square-shaped throwaway inserts comprising flanks each having a flat surface portion in a substantially center portion to an insert-exchangeable, rotary tool, such that a radial rake is negative, and that a major cutting edge formed by an outward curved edge line circularly extends from a lowermost point toward a periphery of the tool, impact applied to the throwaway inserts is eased in a cutting process, thereby achieving high-feed cutting and a long life even with intermittent cutting.

Thus, the throwaway insert detachably attached to an insert-exchangeable, rotary tool according to the present invention comprises substantially square-shaped face and bottom surface and an outward curved flank on each side surface, the throwaway insert having a positive-type shape in which an outward curved edge line formed by the face and the flank serves as a cutting edge, each flank having in a substantially center portion a flat surface portion extending to the bottom surface without contacting with the cutting edge, and a major cutting edge formed by the outward curved edge line circularly extending from its lowermost point toward a periphery of the tool when the insert is attached to the insert-exchangeable, rotary tool, such that it has a negative radial rake.

An angle between the flat surface portion and the face is preferably 3°–10° smaller than an angle between the face and the flank.

Part of the outward circular cutting edge is preferably straight. Also, the major cutting edge is preferably constituted by a plurality of lines and/or curved lines.

The throwaway insert preferably has a breaker-shaped face groove along the major cutting edge.

The radius of curvature of the outward curved edge line is preferably 0.6–1.6 times the diameter of an inscribed circle in the insert.

The insert-exchangeable, rotary tool according to the present invention comprises throwaway inserts detachably attached to the insert-exchangeable, rotary tool, the insert comprising substantially square-shaped face and bottom surface and an outward curved flank on each side surface, and having a positive-type shape in which an outward curved edge line formed by the face and the flank serves as a cutting edge; each flank having in a substantially center portion a flat surface portion extending to the bottom surface without contacting with the cutting edge; a major cutting edge formed by the outward curved edge line circularly extending from its lowermost point toward a periphery of the tool when the insert is attached to the insert-exchangeable, rotary tool, such that it has a negative radial rake; and the lowermost point being positioned inward a center of the outward curved major cutting edge.

The major cutting edge preferably has a cutting edge angle of 35° or less. Also, the radial rake is preferably from −5° to −45°. Further, the major cutting edge preferably has a true rake from +3° to +15°.

In a preferred embodiment, the radial rake of the major cutting edge continuously or intermittently changes toward the periphery of the tool.

DESCRIPTION OF THE PREFERRED EMBODIMENTS

Figure 1:
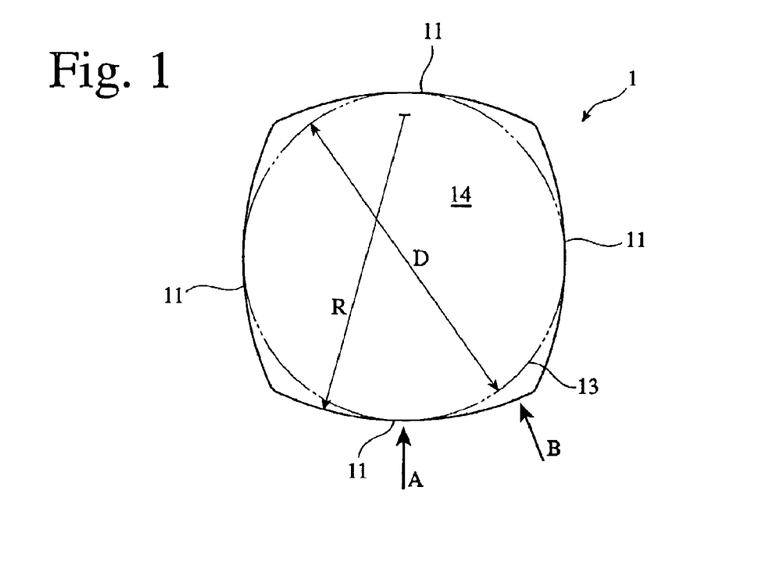
FIG. 1 is a front view showing a throwaway insert according to one embodiment of the present invention.
Figures 2A, 2B:
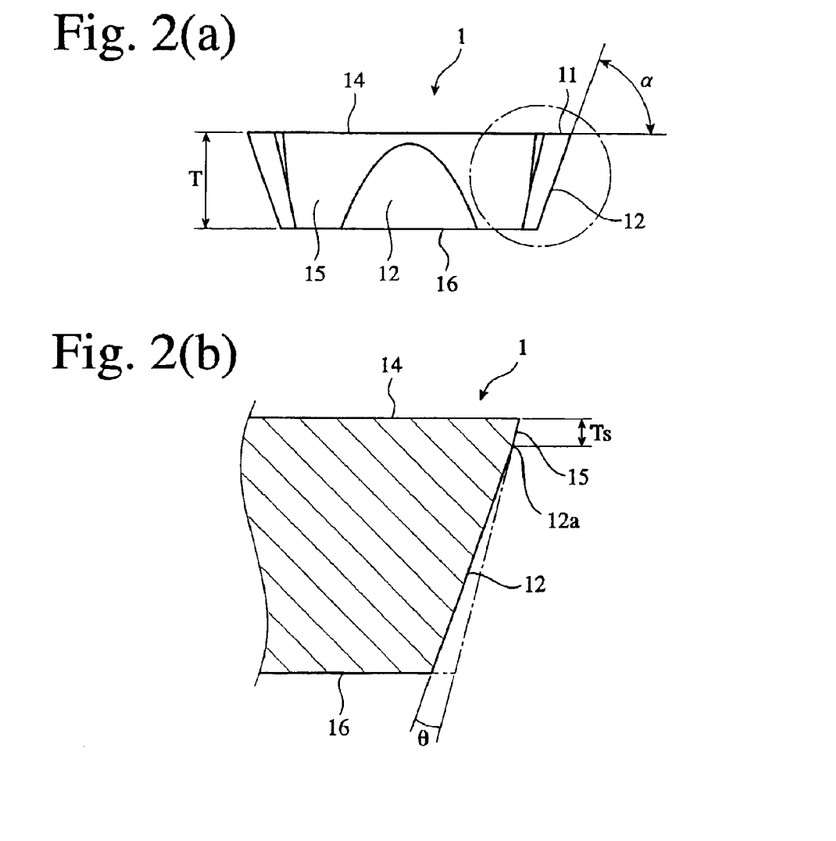
FIG. 2 is a side view of the throwaway insert of FIG. 1, which is viewed from the direction A.
Figure 3:
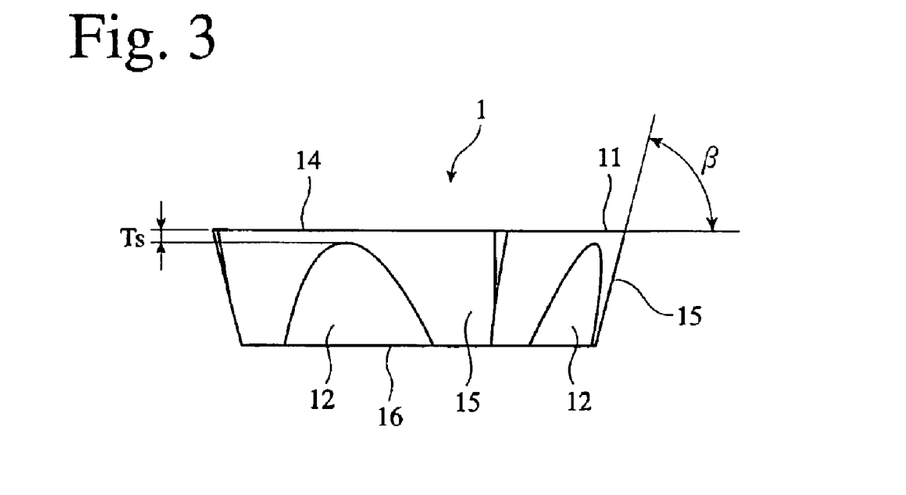
FIG. 3 is a side view of the throwaway insert of FIG. 1, which is viewed from the direction B.
Figure 4:
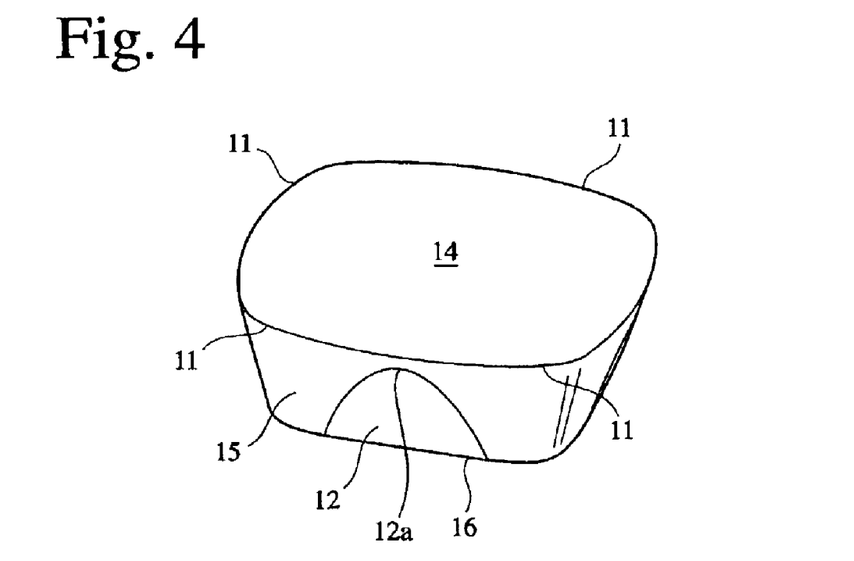
FIG. 4 is a perspective view showing the throwaway insert according to one embodiment of the present invention.

FIG. 1 shows a throwaway insert 1 according to one embodiment of the present invention, FIG. 2(a) is a side view of this throwaway insert 1 viewed from the direction A, and FIG. 2(b) is a partial, enlarged, cross-sectional view showing an encircled portion in FIG. 2(a). FIG. 3 is a side view of throwaway insert 1 of FIG. 1 viewed from the direction B.

This throwaway insert 1 has a substantially square shape as a whole, with an outward curved cutting edge 11 on each side. With respect to the shape of the cutting edge 11, the term "outward curved" means that the insert 1 has an outward bulging edge. However, it is not necessary that the entire cutting edge 11 has a single radius of curvature, but it may be consisting of a plurality of curved lines and may be partially straight. Further, the insert 1 may have a breaker-shaped face groove along the outward curved major cutting edge 11. Though a connecting portion of the adjacent cutting edges 11 is preferably chamfered with a curve having a proper radius of curvature, chamfer may not be needed in some cases with direct connection of both cutting edges 11.

The circular cutting edge 11 has a radius of curvature R preferably 0.6–1.6 times the diameter D of an inscribed circle 13 in the insert 1. When R/D is less than 0.6 times, the insert 1 has substantially the same shape as a round insert, resulting in a large cutting edge angle in applications with a large cutting depth, thereby making it impossible to carry out cutting at a high feed. To make the cutting depth larger with a cutting edge angle unchanged, the inscribed circle 13 should be increased. When R/D is more than 1.6 times, the cutting edge 11 has substantially the same shape as a straight cutting edge, losing the advantages of the curved cutting edge, which are a long life because of long contact length between the cutting edge 11 and a work during cutting, a high strength in intermittent cutting, and high resistance to breakage even when heat cracking occurs because of a compression force during cutting.

A flat surface portion 12 provided in a substantially center portion of the flank 15 on each side of the insert 1 extends from a position 12a separate from the outward curved cutting edge 11 by a slight distance Ts to a bottom surface 16.

The flat surface portion 12 serves as an abutting surface when the insert 1 is attached to a tool body, enabling the precise positioning of the insert 1. An angle α of the flat surface portion 12 to the face 14 is preferably 3°–10° smaller than an angle β of the face 14 to the flank 15. When this difference (angle θ) is less than 3°, sufficient abutting surface area is not obtained. On the other hand, when it is less than 10°, the edge strength decreases.

Figure 5:
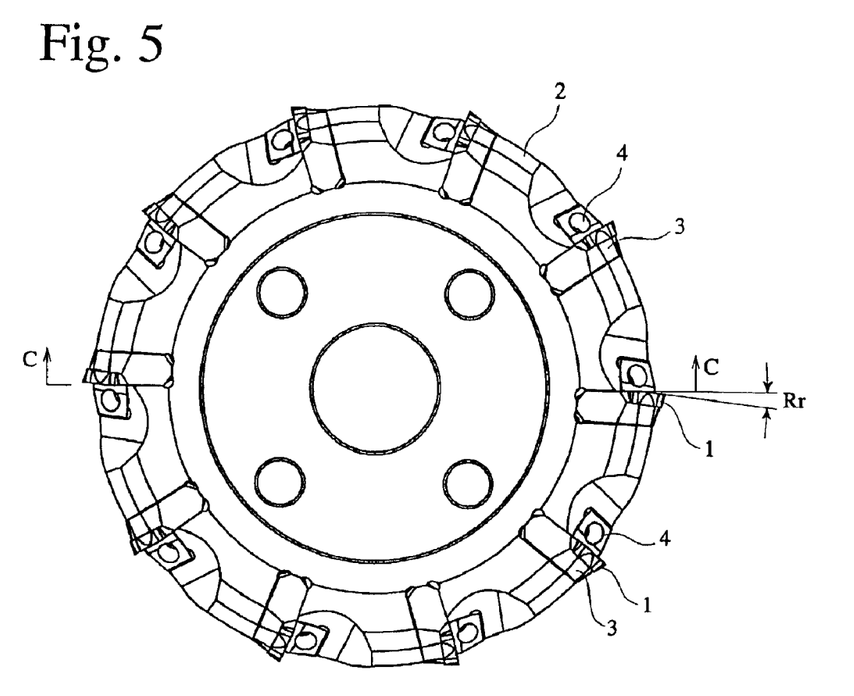
FIG. 5 is a bottom view showing the face-milling tool according to one embodiment of the present invention.
Figure 6:
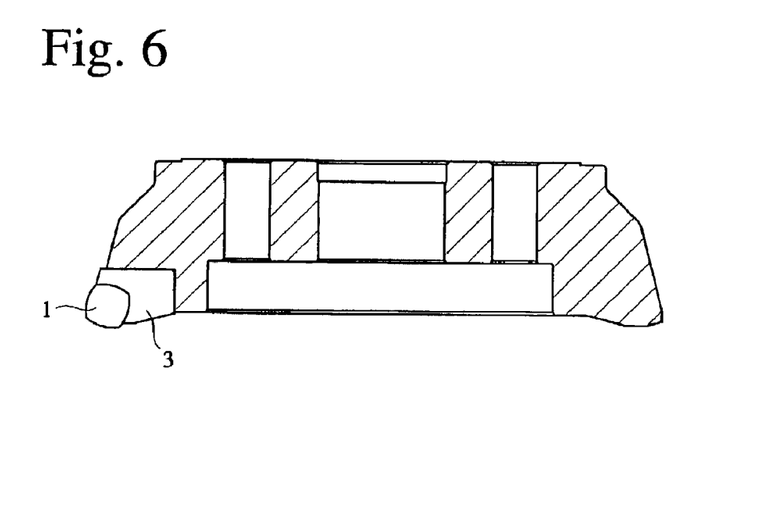
FIG. 6 is a cross-sectional view taken along the line C—C in FIG. 5.

FIGS. 5 and 6 show a face-milling tool as one example of the insert-exchangeable, rotary tool of the present invention, FIG. 5 being a bottom view, and FIG. 6 being a cross-sectional view taken along the line C—C in FIG. 5. As shown in FIG. 6, each throwaway insert 1 is attached to a tool body. The mounting mechanism of the insert 1 per se is known. As shown in FIGS. 5 and 6, the insert 1 can be cramped by a wedge 4 via an insert-supporting member 3 having a seat for supporting the insert 1, so that the insert 1 is attached to the tool body. Alternatively, the insert 1 may be provided with a cramp hole in center portion for a cramping mechanism.

Figure 7:
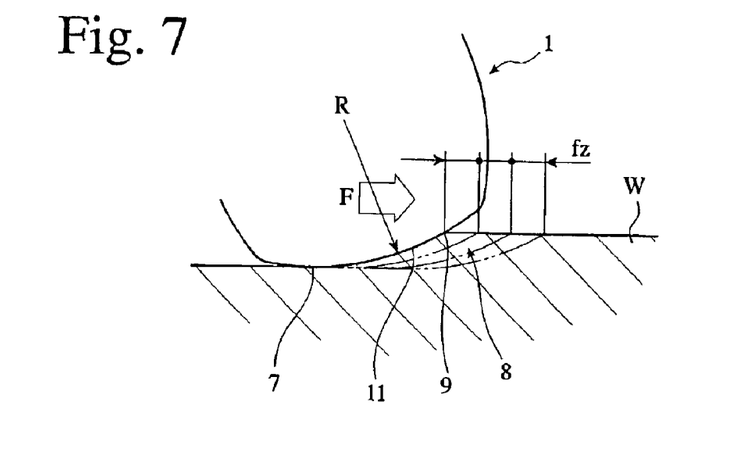
FIG. 7 is a partial, enlarged, cross-sectional view showing the details of a cutting process using the throwaway inserts according to one embodiment of the present invention.
Figure 8:
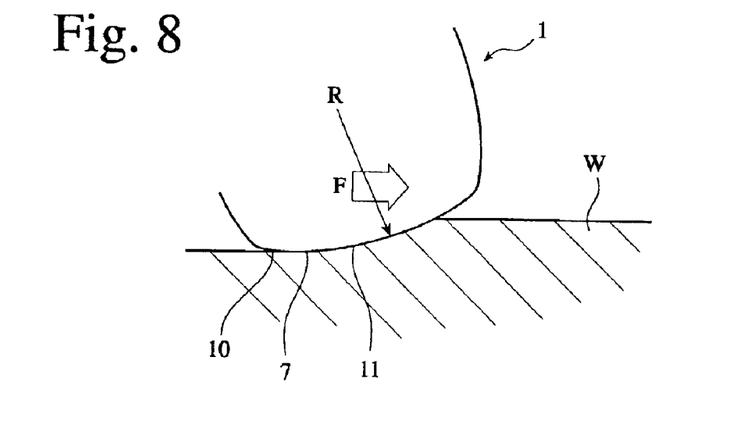
FIG. 8 is a partial, enlarged, cross-sectional view showing the details of a cutting process using the throwaway insert according to another embodiment of the present invention.
Figure 9:
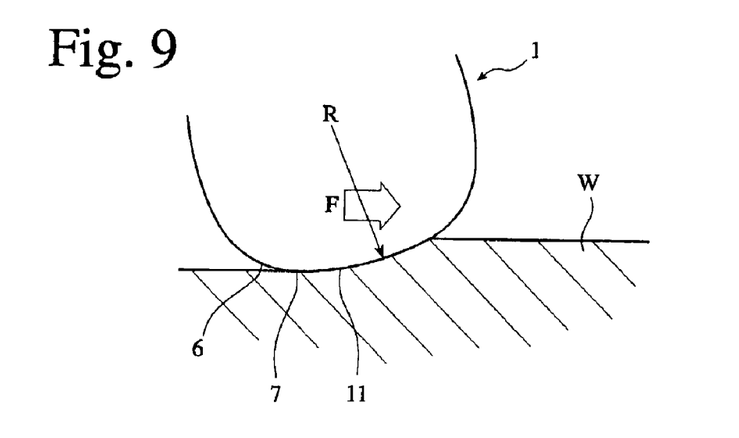
FIG. 9 is a partial, enlarged, cross-sectional view showing the details of a cutting process using the throwaway insert according to a further embodiment of the present invention.

FIGS. 7–9 are enlarged cross-sectional views showing in detail how an insert 1 attached to the face-milling tool shown in FIG. 6 cuts a work W. FIGS. 7–9 indicate that with a cutting edge angle κ set such that the lowermost point 7 of the cutting edge 11 is positioned inward the tool than a center of the cutting edge 11, a portion of the cutting edge 11 engaging cutting can be long to avoid that a center portion of the cutting edge 11 having the weakest strength is first brought into contact with a work W and thus subjected to impact. The cutting edge angle κ is preferably 35° or less.

The inventors have investigated the mechanism of generating impact to the insert 1 in a cutting process, separately on (1) impact when the insert 1 starts to bite the work W (at the start of cutting), (2) impact during a period from engagement to the work W to separation therefrom. As a result, the inventors have found that the impact (1) can be reduced by causing the lowermost point 7 of an outward curved major cutting edge 11 as a starting point of cutting to shallowly bite into a work W, and the impact (2) can be reduced by providing a negative radial rake Rr. With the insert-exchangeable, rotary tool of the present invention having these features, chips 8 generated by contact with the work W at the initial stage of cutting are thin and become gradually thicker as the tool rotates, as shown in FIG. 7. Thus, a large impact force is not applied to the tool, enabling the high feed of the tool and stable intermittent cutting with a long life of throwaway inserts 1.

The throwaway insert 1 is attached to the insert-exchangeable, rotary tool preferably such that radial rake Rr of the major cutting edge 11 is as negative as from −5° to −45°. The radial rake Rr of the major cutting edge 11 may change continuously or intermittently as it nears the periphery of the throwaway insert 1. The true rake of the major cutting edge 11 is preferably +3° to +15°. Incidentally, the true rake is an angle obtained by synthesizing the axial rake and the radial rake. The true rake and the axial rake are defined in JIS B0170.

Figure 10:
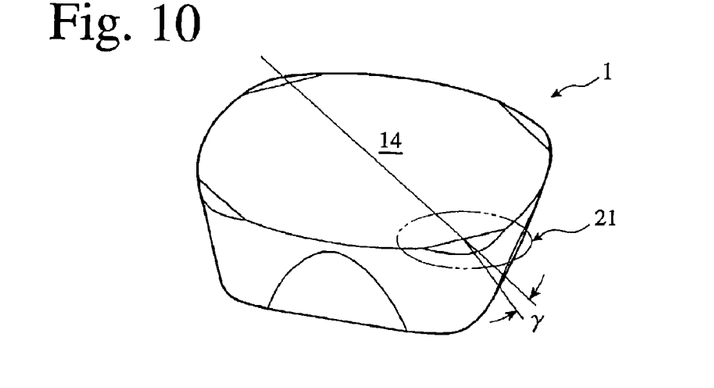
FIG. 10 is a perspective view showing the throwaway insert according to a still further embodiment of the present invention.
Figure 11:
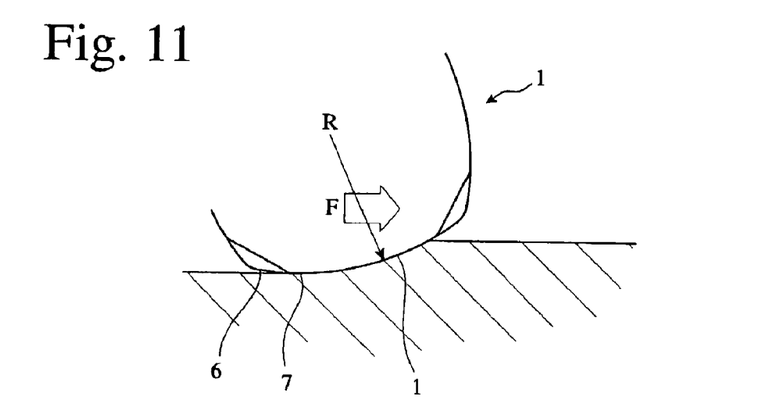
FIG. 11 is a partial, enlarged, cross-sectional view showing the details of a cutting process using the throwaway insert of FIG. 10.
Figure 12:
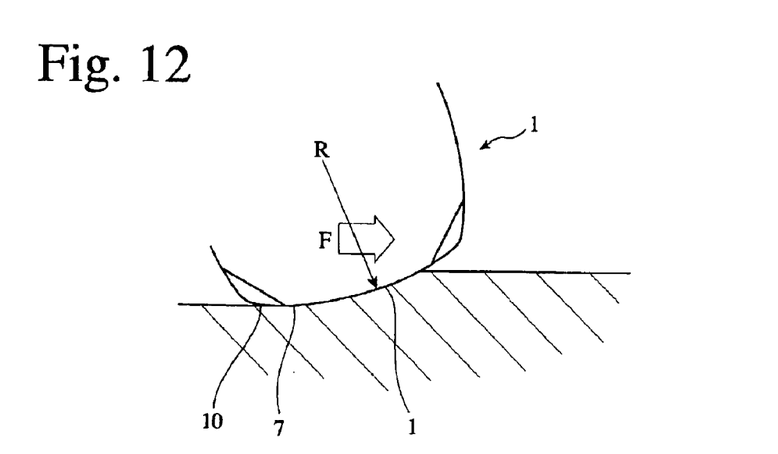
FIG. 12 is a partial, enlarged, cross-sectional view showing the details of a cutting process using the throwaway insert according to a still further embodiment of the present invention.

To improve the surface conditions of the worked surface, the throwaway inserts 1 according to the above embodiments may be modified as described below. For instance, FIG. 8 shows an example with a minor cutting edge 10, and FIG. 9 shows an example with an inside peripheral cutting edge 6. FIGS. 10, 11 show an example chamfered in a corner portion 21 at an angle γ substantially equal to or more than the radial rake, and FIG. 12 shows an example of FIG. 11 with a minor cutting edge 10 added.

The present invention will be described in detail referring to Examples below without intention of limiting the present invention thereto.

EXAMPLE 1, COMPARATIVE EXAMPLES 1, 2

The specifications of the throwaway insert 1 of the present invention shown in FIGS. 1–4 were set as follows:
Diameter D of inscribed circle 13: 15.875 mm,
Radius of curvature R of circular cutting edge 11: 15 mm,
Angle α between face 14 and flat surface portion 12: 70°,
Angle β between face 14 and flank 15: 75°, and
Thickness T: 4.76 mm.

As shown in FIG. 2(b), the flat surface portion 12 extended along the flank 15 from a position 12a receding 0.5 mm from the cutting edge 11 to the bottom surface 16. This insert 1 was attached to the body of the face-milling tool shown in FIG. 5. A radial rake Rr was set at −4°, and an axial rake was set at 9°. A cutting edge angle was set at 15°, such that the lowermost point 7 of the cutting edge 11 was positioned radially inward than a center of the cutting edge 11.

Figure 13:
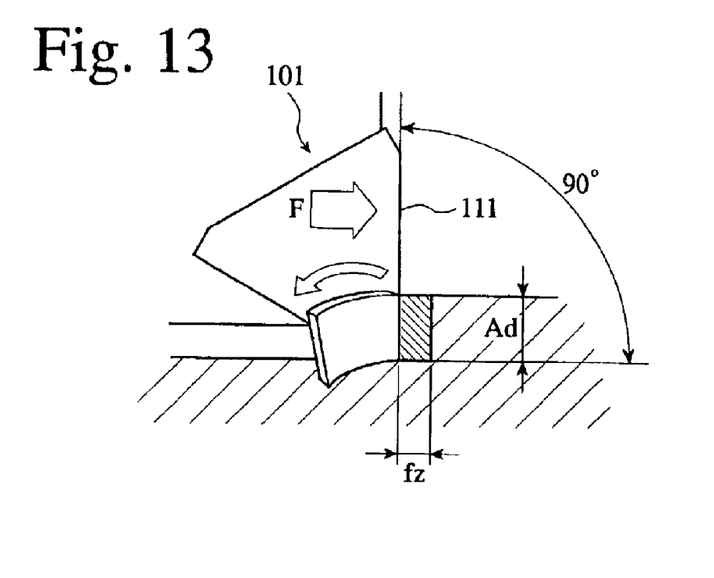
FIG. 13 is a partial, enlarged, cross-sectional view showing the details of a cutting process using the throwaway insert of Comparative Example 1.
Figure 14:
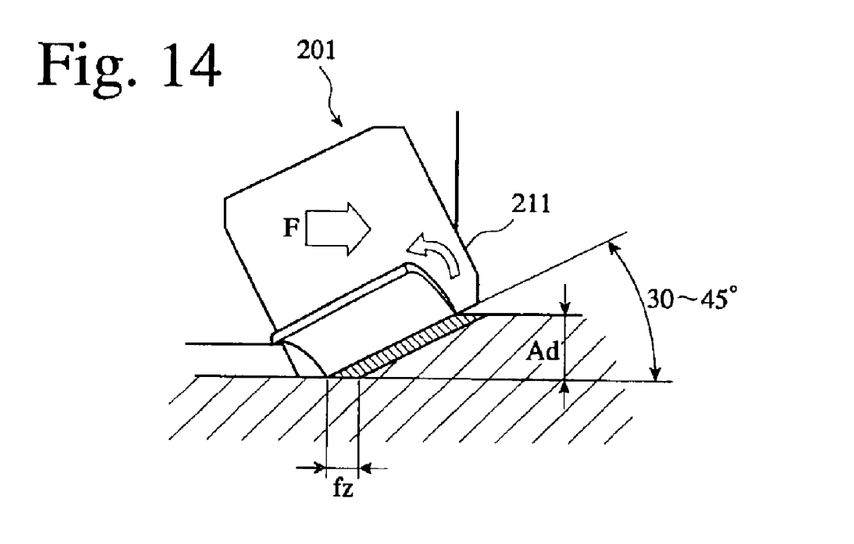
FIG. 14 is a partial, enlarged, cross-sectional view showing the details of a cutting process using the throwaway insert of Comparative Example 2.

For comparison, a regular triangular-shaped throwaway insert 101 having a straight cutting edge 111 as shown in FIG. 13 (Comparative Example 1), and a square-shaped throwaway insert 201 having a straight cutting edge 211 as shown in FIG. 14 (Comparative Example 2) were respectively attached to a face-milling tool for a cutting test. A cutting edge angle was 90° in Comparative Example 1 and 30°–45° in Comparative Example 2.

With these tools, a cutting test was carried out at the maximum feed speed possible under the following cutting specifications to compare the maximum feed speed $F_{max}$ and the amount Q of chips discharged per a unit time.
Diameter of tool edges: 200 mm (full set having 10 inserts),
Work: S50C,
Cutting depth Ad: 2 mm, and
Cutting width Rd: 180 mm.

The feed fz of the insert 1 per one tooth could be made as large as 2.5 mm/tooth at a cutting speed V of as low as 100 m/min in Example 1. Under this condition, stable cutting was kept until the table feed speed F reached 4000 mm/min and the amount Q of chips discharged reached 1440 cm³/min.

On the other hand, F was 800 mm/min, and Q was 288 cm³/min in Comparative Example 1, because the insert 101 was cracked when the feed fz per one tooth was larger than 0.25 mm/tooth at a cutting speed V of 180 m/min. Also, the feed fz per one tooth was limited to 0.4 mm/tooth or less with F=1280 mm/min and Q=460.8 cm³/min in Comparative Example 2, because of the limit of the strength of the insert 201 at a cutting speed V of 180 m/min.

It is clear from the above the results that the table feed speed F per a unit time and the amount Q of chips discharged were 3–5 times improved in Example 1 than in Comparative Examples 1 and 2. Because the insert 1 of Example 1 had outward curved major cutting edges 11, each cutting edge 11 bites a work W shallowly from the lowermost point 7 of the insert 1 at the start of cutting, resulting in small impact. Therefore, the feed fz per one tooth could be made as large as about 1.0–3.5 mm/tooth even in the cutting of steel such as S50C.

With a radial rake of a large negative angle, specifically from about 0° to about −40° such that a true rake is large and not negative, there is a long biting time of the insert 1 to the work W from the lowermost point 7 to the boundary 9. As a result, the insert 1 is sufficiently strong in intermittent cutting, and the throwaway insert 1 has a long life because of a long contact length between the cutting edge 11 and the work W. On the other hand, chips of uniform thickness are generated during cutting in the case of the inserts 101, 201 of Comparative Examples 1 and 2. A smaller cutting edge angle would make chips thinner accordingly. Thus, the feed fz per one tooth was as small as about 0.2–0.4 mm/tooth in the cutting of steel such as S50C.

EXAMPLES 2–4, COMPARATIVE EXAMPLE 3

Figure 15:
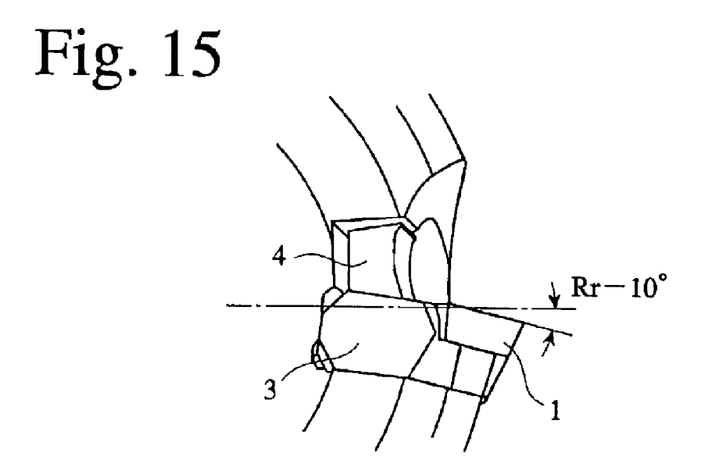
FIG. 15 is a partial, enlarged bottom view showing the face-milling tool of Example 2.
Figure 16:
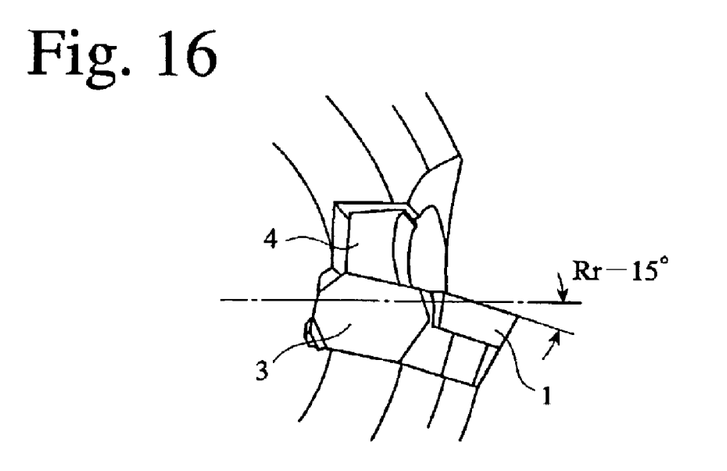
FIG. 16 is a partial, enlarged bottom view showing the face-milling tool of Example 3.
Figure 17:
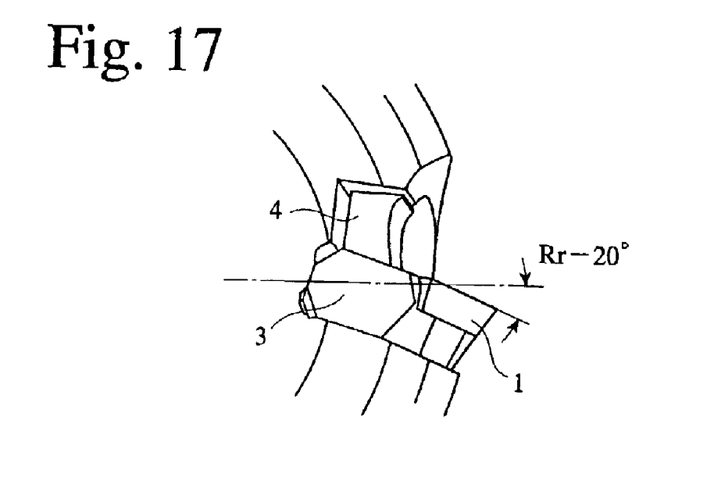
FIG. 17 is a partial, enlarged bottom view showing the face-milling tool of Example 4.

Using the insert of Example 1, the axial rake of a tool body was set at 9°, and the cutting edge angle κ was set at 15° such that the lowermost point 7 of cutting edge was positioned inward than a center of the cutting edge. The radial rake Rr was −10° in Example 2 shown in FIG. 15, −15° in Example 3 shown in FIG. 16, and −20° in Example 4 shown in FIG. 17. For comparison, a tool with a radial rake Rr of −4° (Comparative Example 3), and the tools of Comparative Examples 1 and 2 were also tested.

Figure 18:
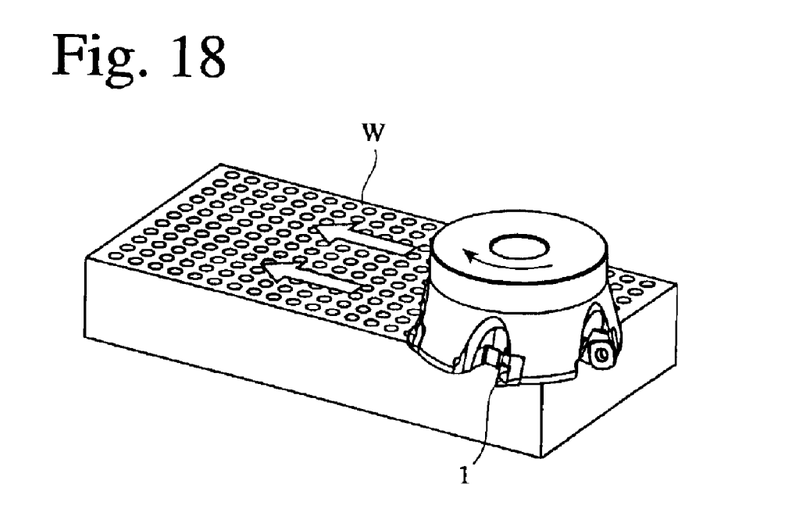
FIG. 18 is a perspective view showing a work cut in Examples and Comparative Examples.

Using the tools of Examples 2–4 and Comparative Examples 1–3 (each 6-tooth face-milling tool, to which only one insert was attached), a cutting test was carried out on a work having a large number of holes each having a diameter of 8 mm shown in FIG. 18, which easily caused cracking in inserts, to measure the feed fz per one tooth, which expresses cutting efficiency, until each insert was subjected to initial cracking. The cutting specifications were as follows:
Diameter of tool edges: 125 mm,
Work: pre-hardened steel [SCM440 (HS40)],
Cutting speed: 150 m/min,
Cutting depth Ad: 1 mm, and
Cutting width Rd: 90 mm.

Figure 19:
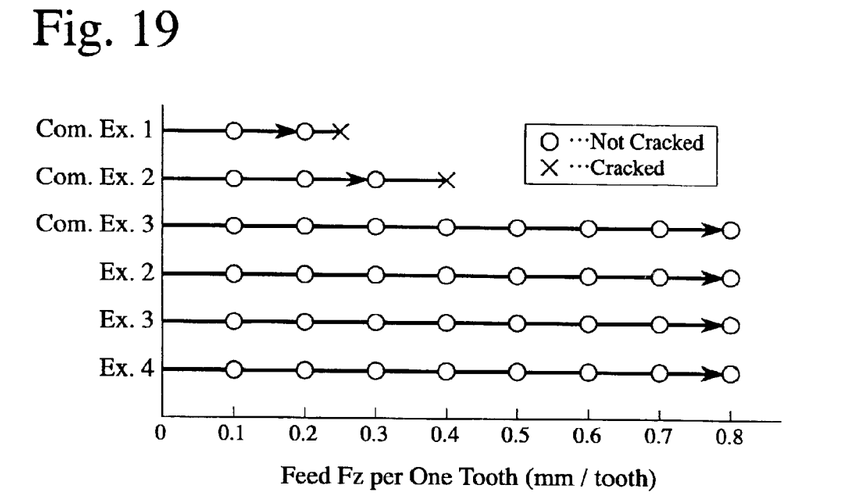
FIG. 19 is a graph showing the test results of feed limit in Examples 2–4 and Comparative Examples 1–3.

The cutting results are shown in FIG. 19. No cracking occurred in the inserts of Examples 2–4 and Comparative Example 3, even though the feed fz per one tooth was increased from 0.1 mm/tooth to 0.8 mm/tooth. On the other hand, cracking occurred at a feed fz per one tooth of 0.25 mm/tooth in the insert of Comparative Example 1. Cracking also occurred at a feed fz per one tooth of 0.4 mm/tooth in the insert of Comparative Example 2.

Figure 20:
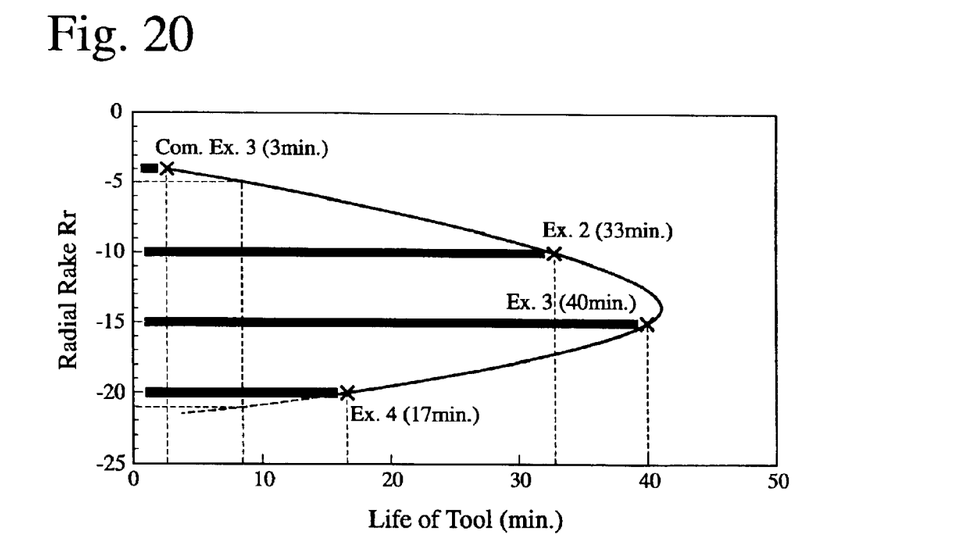
FIG. 20 is a graph showing the test results of life in Examples 2–4 and Comparative Example 1.

Under as hard conditions as beyond common sense with a feed fz per one tooth increased to 1.5 mm/tooth, a cutting test was carried out to compare the life of each tool. The results are shown in FIG. 20. While the life was 3 minutes in Comparative Example 3, it was 33 minutes in Example 2, 40 minutes in Example 3, and 17 minutes in Example 4. It was confirmed from these results that as the radial rake Rr increased in a negative direction, the life of inserts increased even under extremely hard intermittent cutting conditions. The true rake was 6.1° in Example 2, 4.8° in Example 3, 3.4° in Example 4, and 7.7° in Comparative Example 3. It was confirmed from these results that when the true rake was 3° or more, the life of inserts was long even under extremely hard intermittent cutting conditions.

EXAMPLES 5–8

Figure 21:
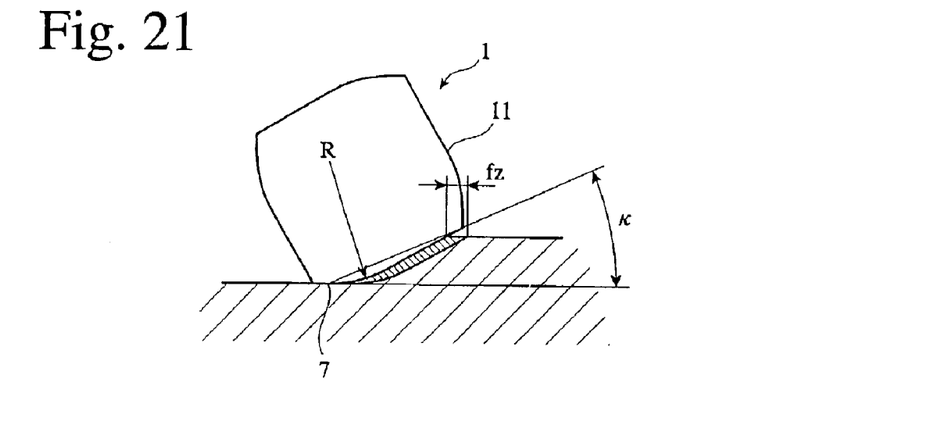
FIG. 21 is a partial, enlarged, cross-sectional view showing the details of a cutting process using the throwaway insert according to a still further embodiment of the present invention.
Figure 22:
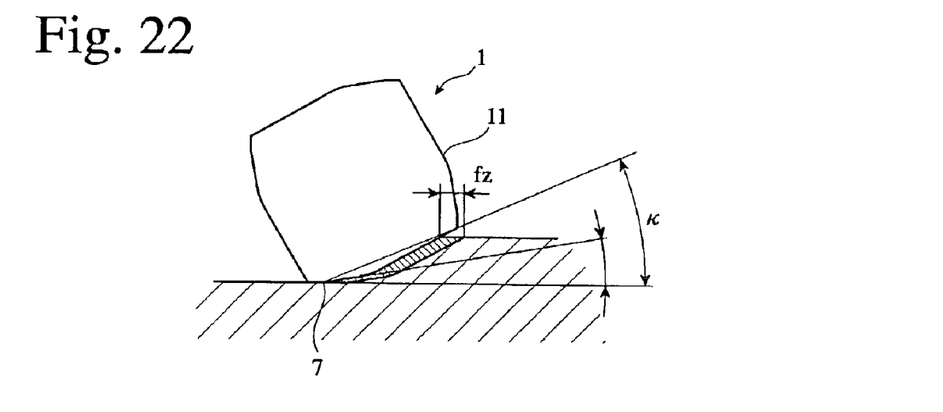
FIG. 22 is a partial, enlarged, cross-sectional view showing the details of a cutting process using the throwaway insert according to a still further embodiment of the present invention.
Figure 23:
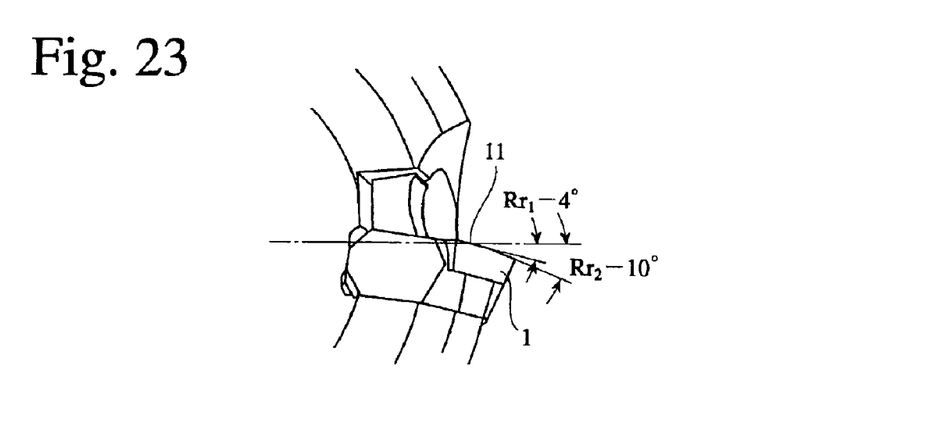
FIG. 23 is a partial, enlarged bottom view showing the face-milling tool according to a still further embodiment of the present invention.

The same effect was obtained, with a major cutting edge 11 consisting of a curved line extending from the lowermost point 7 toward the periphery and a straight line as shown in FIG. 21 (Example 5), with a major cutting edge 11 consisting of a plurality of straight lines from around the lowermost point 7 toward the periphery at a cutting edge angle κ of 35° or less as shown in FIG. 22 (Example 6), with a negative radial rake Rr changed intermittently as shown in FIG. 23 (Example 7), or with a radial rake Rr changed smoothly and continuously with a convex upper surface of an insert (Example 8). This effect is widely obtained ranging from a small diameter to a large diameter regardless of the diameter of cutting tool edge.

As described above in detail, the insert-exchangeable, rotary tool such as a face-milling tool, etc. equipped with the throwaway insert of the present invention can cut a work efficiently at a high feed, with a long life because of improved crack resistance. The insert-exchangeable, rotary tool of the present invention having such features shows excellent cutting performance for works with many holes, works of pre-hardened steel, etc.

What is claimed is:

1. A throwaway insert detachably attached to an insert-exchangeable, rotary tool, comprising substantially square-shaped face and bottom surface and an outward curved flank on each side surface, said throwaway insert having a positive-type shape in which an outward curved edge line formed by said face and said flank serves as a cutting edge, each flank having in a substantially center portion a flat surface portion extending to said bottom surface without contacting with said cutting edge, and a major cutting edge formed by said outward curved edge line circularly extending from its lowermost point toward a periphery of said tool when said insert is attached to said insert-exchangeable, rotary tool, such that it has a negative radial rake.

2. The throwaway insert according to claim 1, wherein an angle between said flat surface portion and said face is 3°–10° smaller than an angle between said face and said flank.

3. The throwaway insert according to claim 1, wherein part of said outward curved cutting edge is straight.

4. The throwaway insert according to claim 2, wherein part of said outward curved cutting edge is straight.

5. The throwaway insert according to claim 1, wherein said major cutting edge is constituted by a plurality of lines and/or curved lines.

6. The throwaway insert according to claim 1, wherein it has a breaker-shaped face groove along said major cutting edge.

7. The throwaway insert according to claim 1, wherein the radius of curvature of said outward curved edge line is 0.6–1.6 times the diameter of an inscribed circle in said insert.

8. An insert-exchangeable, rotary tool to which throwaway inserts are detachably attached, said insert comprising substantially square-shaped face and bottom surface and an outward curved flank on each side surface, and having a positive-type shape in which an outward curved edge line formed by said face and said flank serves as a cutting edge; each flank having in a substantially center portion a flat surface portion extending to said bottom surface without contacting with said cutting edge; a major cutting edge formed by said outward curved edge line circularly extending from its lowermost point toward a periphery of said tool when said insert is attached to said insert-exchangeable, rotary tool, such that it has a negative radial rake; and said lowermost point being positioned inward a center of said outward curved major cutting edge.

9. The insert-exchangeable, rotary tool according to claim 8, wherein said major cutting edge has a cutting edge angle of 35° or less.

10. The insert-exchangeable, rotary tool according to claim 8, wherein said radial rake is from −5° to −45°.

11. The insert-exchangeable, rotary tool according to claim 8, wherein the radial rake of said major cutting edge continuously or intermittently changes toward the periphery of said tool.

12. The insert-exchangeable, rotary tool according to claim 8, wherein said major cutting edge has a true rake from +3° to +15°.

* * * * *